United States Patent [19]
Kaneko et al.

[11] 4,268,303
[45] May 19, 1981

[54] DIRECT REDUCTION PROCESS FOR PRODUCING REDUCED IRON

[75] Inventors: Dentaro Kaneko, Kobe; Mamoru Onoda, Miki; Yoshio Kimura, Akashi; Yutaka Inada, Yokohama; Masahiro Tomita, Kobe, all of Japan

[73] Assignee: Kobe Steel, Limited, Kobe, Japan

[21] Appl. No.: 25,100

[22] Filed: Mar. 29, 1979

[30] Foreign Application Priority Data

Apr. 10, 1978 [JP] Japan ................................. 53/42439

[51] Int. Cl.² .............................................. C21B 13/02
[52] U.S. Cl. ......................................... 75/34; 75/35
[58] Field of Search ............... 75/35, 26, 34, 36–38, 75/91

[56] References Cited

U.S. PATENT DOCUMENTS

| | | | |
|---|---|---|---|
| 4,054,444 | 10/1977 | Clark | 75/35 |
| 4,099,963 | 7/1978 | MacKay | 75/35 |

*Primary Examiner*—M. J. Andrews
*Attorney, Agent, or Firm*—Oblon, Fisher, Spivak, McClelland & Maier

[57] ABSTRACT

The present invention discloses a direct reduction process for producing reduced iron by reducing iron ores and/or pellets with reducing gases, wherein the iron ores and/or pellets are reduced to a degree of reduction of 30–80% by a reducing gas containing 15–40% by volume of methane at a temperature of more than 950° C. and further reduced by a reducing gas containing high proportion of carbon monoxide and/or hydrogen at a temperature of below 1000° C.

7 Claims, 3 Drawing Figures

DIRECT REDUCTION PROCESS FOR PRODUCING REDUCED IRON

BACKGROUND OF THE INVENTION

1. Field of the Invention

This invention relates to a process for producing reduced iron, and more particularly to a direct reduction process to produce reduced iron efficiently and economically by directly utilizing methane as a reducing gas.

2. Description of the Prior Art

The direct reduction process has undergone various technical improvements and it is only in recent years that large scale commercial plants employing this process are beginning to be constructed. There are various types of direct reduction processes, such as the rotary-kiln process, the static bed process, the fluidized bed process, and the shaft furnace process. Among these processes, the shaft furnace process is based on a counter current principle, whereby iron oxide raw materials are charged from the top of the furnace into contact with a reducing gas blown in from the bottom of the furnace so as to produce reduced iron, and this process is gaining ground because of its high thermal efficiency and gas utilization. As the reducing gas for the direct reduction process, a gas which consists mainly of carbon monoxide (CO) and hydrogen ($H_2$) has been used. This reducing gas is produced by a so-called gas reforming technique, by which hydrocarbon (CnHm) such as methane ($CH_4$) reacts with water vapor and carbon dioxide ($CO_2$) or oxygen ($O_2$) to form CO and $H_2$. Accordingly, it is necessary to install in the iron-production facility a reformer for decomposing $CH_4$ into CO and $H_2$, in addition to a reactor where iron oxides such as iron ores or pellets are reduced into metallized iron. Furthermore, $CH_4$ has not been positively utilized as a direct reducing gas. The reasons why $CH_4$ has not been directly used as reducing gas and why the reforming process has been required, are as follows.

(1) At customary temperatures for the reducing reaction (ordinarily below 900° C.) in furnaces such as the shaft furnace, the potential of $CH_4$ for reducing the iron oxide is not sufficient. Although the potential can be fairly improved by raising the reaction temperature, the high temperature results in so-called clustering, a phenomenon in which reduced iron pellets stick to each other, obstructing the descent of the burden; hence the temperature cannot be raised to more than the normal reaction temperature.

(2) As temperature rises, $CH_4$ decomposes into hydrogen and solid carbon according to the following reaction.

$$CH_4 = 2H_2 + C \qquad (I)$$

And at the same time reduced iron promotes this reaction as a catalyst. When this reaction proceeds further, deposited carbon formed by this reaction fills the voids within the burden, resulting in a higher gas pressure drop and thereby smooth operation will be prevented.

(3) The reaction in which the iron oxide is reduced with $CH_4$ is expressed as follows:

$$Fe_2O_3 + CH_4 = 2FeO + CO + 2H_2 \qquad (II)$$

$$FeO + CH_4 = Fe + CO + 2H_2 \qquad (III)$$

Both of these reactions are highly endothermic reactions, and it is difficult to compensate for the heat required for these reactions in the ordinary shaft furnace process and therefore smooth operation cannot be maintained.

For the reasons described above, $CH_4$ has not been utilized as a reducing gas for direct reduction, making it imperative that the gas reforming process be employed. However, this reforming process greatly affects the productivity and production cost of the reduced iron. Although there are some methods now under study, in which $CH_4$ is introduced directly into the reactor to reduce the iron oxide, or the gas is reformed while iron oxide is reduced, no satisfactory results have yet been obtained. The only example that directly uses $CH_4$ for reducing iron oxide may be found in the Japanese Patent Publication No. 52-22612, in which only a limited amount of $CH_4$ is directly used as a reducing agent making use of the auto-catalytic reaction of the metallized iron.

SUMMARY OF THE INVENTION

This invention has been devised to overcome the technical problems associated with the conventional direct reduction process. An object of the invention is to provide a direct reduction process which renders unnecessary or reduces the role of the gas reformer which has been regarded as an essential component in the conventional gaseous direct reduction process, so that reduced iron can be obtained efficiently and economically. Another object of the invention is to provide a direct reduction process in which $CH_4$ can be effectively utilized as a reducing gas by correctly establishing the relation between the degree of reduction of iron oxide and the temperature of reducing reaction.

In the first embodiment according to the present invention, iron ores and/or pellets are reduced to the degree of reduction of about 30–80% in a first stage reduction zone by a gas containing 15–40% by volume of $CH_4$ which is heated to a temperature of more than about 950° C. or preferably about 1000°–1200° C. and then further undergo reduction in a second stage reduction zone by a gas consisting mainly of CO and/or $H_2$ at a temperature below about 1000° C. or preferably about 750°–950° C.

In the second embodiment, the reducing gas as described in the first embodiment contains about 15–40% by volume of $CH_4$, 15–40% by volume of CO and 30–60% by volume of $H_2$.

In the third embodiment, the reducing gas as described in the first embodiment contains about 20–60% by volume of CO, 30–70% by volume of $H_2$ and 2–7% by volume of $CH_4$.

BRIEF DESCRIPTION THE DRAWINGS

Figure 3:
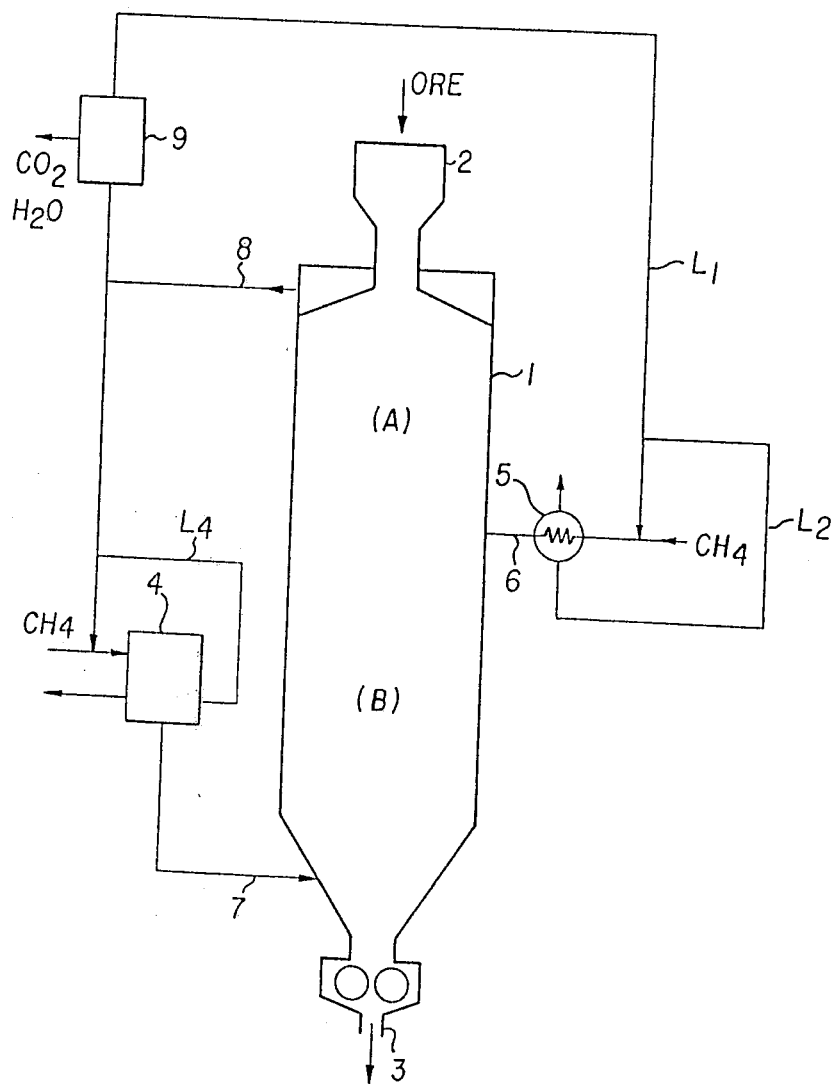

FIG. 3 diagrammatically illustrates one example of the system for reducing the iron oxide in accordance with the present invention.

Reference numerals used in the drawings designate as follows:

1: shaft furnace; 2: charging hopper; 3: discharging means; 4: reformer; 5: heater; 6: tuyere for blowing in a $CH_4$-rich gas; 7: tuyere for blowing in CO and $H_2$ gases;

8: gas exhaust port on top of the furnace; 9: exhaust gas purifying means.

DETAILED DESCRIPTION OF THE PREFERRED EMBODIMENTS

The direct reduction process according to this invention will now be described with reference to the accompanying drawings.

Figure 1:
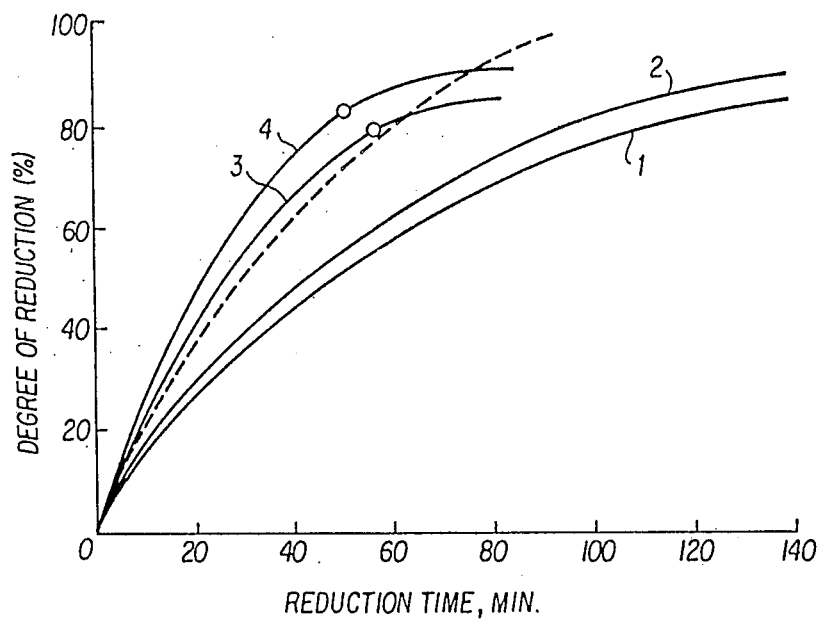
FIG. 1 is a graph showing the degree of reduction in relation to the reduction time.

FIG. 1 shows the relation between reduction time and degree of reduction for the fired pellets of high quality (T.Fe 68.4 Wt%, $SiO_2$ 1.1 Wt%) when it is reduced with a 30% $CH_4$ gas (20% CO, 35% $H_2$, 30% $CH_4$, 5% $CO_2$: percentage is a volume percentage and the same applies to all gases hereinafter.) at different temperatures, with a solid curve (1) showing the relation at a temmperature of 760° C., a curve (2) at 860° C., a curve (3) at 960° C. and a curve (4) at 1060° C. In the same drawing there is also shown, for comparison, a dotted line which is obtained when the reduction is effected in the shaft furnace with a normal reducing gas consisting mainly of CO and $H_2$ (36% CO, 55% $H_2$, 4% $CH_4$ and 5% $CO_2$) at a normal temperature of 860° C. As can be seen from the same drawing, if the temperature is ordinary (about 750°–900° C.) and gas containing a large proportion of $CH_4$ is used as the reducing gas, the degree of reduction remains low (solid lines (1) and (2)) even after a reasonably long time, showing that the reducing potential of $CH_4$ is insufficient at low temperatures.

However, if the reduction temperatures are higher than normal, for instance 960° C. and 1060° C., reduction proceeds at a higher speed during the initial and intermediate stages of reduction (solid lines (3) and (4)) than when the reduction is effected (dotted line) under the normal condition using gas consisting mainly of CO and $H_2$. In this case also, the speed at which reduction proceeds becomes slow in the last stage of reduction after a reduction degree of about 75–80% has been attained (marked point ⊗). This is because a large amount of carbon has been formed from the decomposition of $CH_4$ so that the gas permeability of charged material layer deteriorates, hindering the reducing reaction.

It is recognized from the foregoing that although the use of $CH_4$ as a gas for reducing the iron oxide to the final degree of reduction (ordinarily about 95% or more) is not appropriate, $CH_4$ gas is more suitable than the normal gas of CO and $H_2$ in effecting reduction of up to 75–80% in a short time if the gas is heated up at higher temperature. However, since this process requires higher-than-normal temperatures, according to the actual operation of the direct reduction, it is necessary that the clustering of the charged material will not take place even at such high temperatures.

Figure 2:
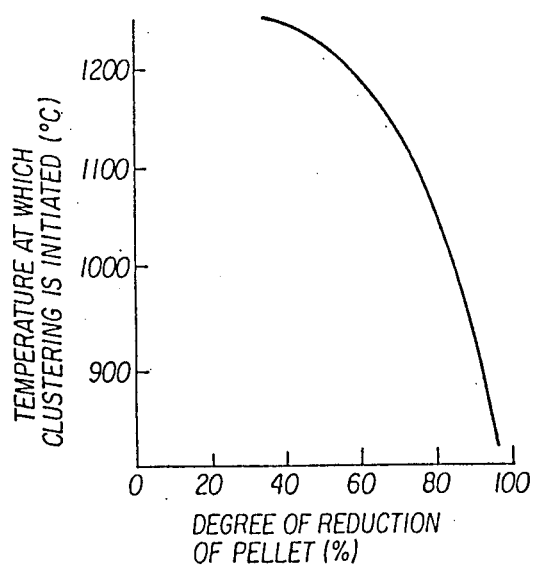
FIG. 2 is a graph showing the relation between the temperature at which the clustering is initiated, and the degree of reduction of the pellets.

FIG. 2 illustrates the relation between the degree of reduction of pellets and the temperature at which clustering is initiated. This curve is obtained by first reducing iron oxide pellets with $H_2$—CO mixture gas to a certain degree of reduction, by applying to the reduced iron in the presence of inert gas the load corresponding to the pressure to which the reduced iron would be subjected in the actual shaft furnace and by leaving them at different temperatures. The graph shows that when the degree of reduction exceeds about 80%, the temperature of clustering initiation rapidly decreases, but when the degree of reduction is below 80%, clustering does not occur when the temperature is as high as 1000° C. or even at 1200° C.

This invention is based on the foregoing findings. According to the invention, the reduction of iron oxide is divided at a certain degree of reduction into two stages. In the first stage of reaction, a gas containing a large proportion of $CH_4$ is used as a reducing gas and in the latter stage a gas consisting mainly of CO and/or $H_2$ is used, thus efficiently and economically effecting the reducing reaction.

In other words, in the first stage up to 80% reduction can be rapidly carried out within a short period of time by employing a gas consisting mainly of $CH_4$ which is set at more than 950° C. or preferably at about 1000°–1200° C. to raise the reducing potential of $CH_4$ sufficiently. Within the range of up to 80% reduction, clustering is not likely to occur even at a high temperature of up to about 1000°–1200° C. and therefore smooth operation of the furnace can be maintained. In order to utilize $CH_4$ effectively, it is advantageous to select the reduction degree in the first stage approximately between 30% and 80%. After the reduction rate reaches about 80%, further reduction up to the final reduction degree (normally about 95-98%) is performed in the second stage. The reducing gas used in the second stage is the ordinary shaft furnace gas consisting mainly of CO and/or $H_2$ and its temperature is preferably set at about 750°–950° C. to keep the optimum reaction velocity as well as prevent clustering.

The $CH_4$ content in the gas used in the first stage reduction may be more than 15%. But if the content of $CH_4$ is excessively large, gas-permeability of the charged material deteriorates due to the quantity of solid carbon formed in the aforementioned reaction (I) or the endothermal heat for the reactions (II) and (III) increases. To avoid these disadvantages it is preferable to limit the $CH_4$ content to less than about 40%. In addition to $CH_4$, this gas may include such contents as 15-40% CO, 30-60% $H_2$, etc. In the actual reducing operation in the plant, the content of $CH_4$ in the reducing gas can be adjusted by diluting it with exhaust gas consisting mainly of CO and $H_2$ exhausted from the top of the shaft furnace. In other words, the exhaust gas from the top of the furnace is directly introduced or, after having been stripped of $CO_2$ and $H_2O$, indirectly introduced into the shaft furnace in which it is mixed with $CH_4$ to keep the density of $CH_4$ in the first stage reduction zone at about 15–40% so as to effect the first stage of reduction as expressed in the reactions (II) and (III). The reaction in this stage is an endothermic reaction as described before, and the heat required for this reaction can be obtained by raising the temperature in the furnace to more than 950° C. or preferably as high as 1000°–1200° C. and also by recycling and mixing the discharged gas from the top of the furnace with the reducing gas in the zone of the first stage reduction. Gases that are produced in the first stage of reduction as a result of reactions expressed in (II) and (III) consist mainly of CO and $H_2$, and can be used as the reducing gas in the second stage of reduction.

The reduction in the second stage is carried out to attain the final reduction degree according to the following reactions:

$$FeO + H_2 = Fe + H_2O \qquad (IV)$$

$$FeO + CO = Fe + CO_2 \qquad (V)$$

As a reducing gas for the second stage of reduction, a CO—$H_2$ mixture gas is used whose composition may, for example, be 20-60% CO, 30-70% $H_2$ and 2-7% $CH_4$. With a view to avoiding the formation of clusters as well as obtaining optimum reaction velocity, the reaction temperature is kept below 1000° C. or preferably at about 750°-950° C.

Now referring to FIG. 3, the method according to the present invention will be explained. FIG. 3 diagrammatically illustrates the direct reduction system according to the invention, taking as an example the shaft furnace. Designated (1) is a shaft furnace, (2) a charging hopper for continuously feeding iron oxide (such as iron ore, pellets, etc) into the shaft furnace, (3) a reduced iron discharging means such as hot briquet for continuously discharging the reduced iron, and (4) a gas reformer for converting $CH_4$ into CO and $H_2$.

The shaft furnace comprises the zone (A) for first stage reduction in its upper portion and the zone (B) for second stage reduction in the lower portion, the first zone (A) being supplied with a reducing gas containing a high proportion of $CH_4$ and the second zone (B) being supplied with a gas composed of a high proportion of CO and $H_2$. In supplying the $CH_4$-rich gas into the zone (A), $CH_4$ is diluted with the exhaust gas (mainly CO and $H_2$) extracted from the furnace top and supplied through a line (L1) so that the content of $CH_4$ in the zone (A) will be kept at around 15-40%. At the same time, the mixed gas is heated by a heater (5) to above 950° C., preferably to about 1000°-1200° C., and then blown in through a tuyere (6). In supplying the gas containing mainly CO and $H_2$ into the zone (B), which is obtained by the conversion of $CH_4$ into CO and $H_2$ in the reformer (4), the gas is kept at a temperature below approximately 1000° C., or preferably at about 750°-950° C. and then fed in through a tuyere (7). The iron oxide, continually charged into the furnace from the furnace top, first undergoes the first stage of reducing reaction with $CH_4$ gas (as expressed in (II) and (III)) in the first zone (A) until the reduction degree reaches up to 80%, and then in the second zone (B) undergoes the second stage of reducing reaction with CO and $H_2$ gases (as expressed in (IV) and (V)) in the second zone (B) to be transformed into metallized iron, which is discharged by the discharging means.

At the same time, CO and $H_2$ gases and unprocessed $CH_4$ gas produced as a result of the first stage of reducing reaction in the first zone (A), and $CO_2$ and $H_2O$ generated in the second stage of reduction zone (B) are extracted from the port (8) on the top of the furnace. A part of these exhausted gases is, if necessary, passed through a purifier (9) to remove $CO_2$ and $H_2O$ and then recycled through the line (L1) and into the furnace through the tuyere (6) to adjust the content of $CH_4$ gas. A portion of the exhaust gas recycled through the line (L1) may be supplied as fuel through a line (L2) to the heater (5). If necessary, a portion of the exhaust gas may also be supplied through a line (L3) to the reformer (4) where it is converted into CO and $H_2$ gases which in turn are recycled, as the reducing gas for the second stage reduction, into the furnace from the tuyere (7). Furthermore, a part of the exhaust gas that passes through the line (L3) may be supplied as fuel to the reformer (4) through a line (L4).

Now, referring to examples of the invention, the process for producing the reduced iron will be explained.

EXAMPLES

In the system shown in FIG. 3, the iron oxide ($Fe_2O_3$) was reduced with $CH_4$-rich gas at a temperature of 1100° C. and then further reduced with CO—$H_2$-rich gas at a temperature of 800° C. As a result, 1 ton of reduced iron was obtained from 1.43 tons of iron oxide. In this process, the iron oxide was heated at 400° C. before entering the furnace and the reduced iron was discharged from the furnace at 800° C. Details on the quantity, composition and temperature of gases on each part in this system are shown below.

(1) $CH_4$-rich gas supplied to the first stage reduction zone (The gas consisted of 1500 $Nm^3$ of recycled exhaust gas, as described in item (3), and 250 $Nm^3$ of $CH_4$ of the same temperature).
Quantity of gas: 1750 $Nm^3$
Temperature: 1100° C.
Composition ($Nm^3$): $CH_4$-460 (26%), $H_2$-810 (46%), CO-480 (27%)

(2) Exhaust gas from the furnace top
Quantity of gas: 2500 $Nm^3$
Temperature: 500° C.
Composition ($Nm^3$): $CH_4$-280 (11%), $H_2$-1100 (44%), CO-650 (26%), $H_2O$-300 (12%), $CO_2$-170 (7%)

(3) Exhaust gas recycled through the purifier (9) and the line (L1) (the quantity of exhaust gas supplied to The purifier was 1910 $Nm^3$ and that of $CO_2$ and $H_2O$ removed by the purifier was 410 $Nm^3$).
Quantity of gas: 1500 $Nm^3$
Temperature: 25° C.
Composition ($Nm^3$): $CH_4$-210 (14%), $H_2$-810 (54%), CO-480 (32%)

(4) Exhaust gas fed to the reformer through the line (L3) (Of 590 $Nm^3$ that passes through the line (L3)—i.e., a quantity from exhaust gas being deducted of gas flowing into the purifier—170 $Nm^3$ was used as fuel.)
Quantity of gas: 420 $Nm^3$
Temperature: 350° C.
Composition ($Nm^3$): $CH_4$-50 (11%), $H_2$-200 (47%), CO-100 (24%), $H_2O$-50 (13%), $CO_2$-20 (6%)

(5) CO—$H_2$-rich gas supplied to the second zone for the second stage of reduction
Quantity of gas: 520 $Nm^3$
Temperature: 950° C.
Composition ($Nm^3$): $CH_4$-10 (2%), $H_2$-310 (60%), CO-160 (31%), $H_2O$-30 (6%), $CO_2$-3 (1%).

With the process according to the invention, almost all the reducing gas required for the reducing reaction can be obtained from $CH_4$. This obviates or greatly reduces necessity of the reformer. Since the exhaust gas recycling system is adopted, the fuel consumption is greatly reduced, for example, to 250 $Nm^3$ of $CH_4$ for one ton of reduced iron, so that it is economically advantageous.

What is claimed is:
1. A direct reduction process for producing reduced iron by reducing iron ores and/or pellets with reducing gases in a shaft furnace comprising the steps of:
(1) reducing the iron ores and/or pellets to a degree of reduction of 30-80% with a first reducing gas heated to a temperature of more than 950° C. in a first reduction zone, said first reducing gas containing 15-40% by volume of methane, and
(2) further reducing the iron ores and/or pellets thus reduced with a second reducing gas at a temperature below 1000° C. in a second reduction zone, said second reducing gas containing a high proportion of carbon monoxide and/or hydrogen and a proportion of methane between zero and a proportion which is less than the proportion which causes heavy carbon deposition within the burden or retardation of the rate of reduction.

2. The direct reduction process of claim 1, wherein the temperature of said first reducing gas is 1000°–1200° C.

3. The direct reduction process of claim 1, wherein the temperature in said second reduction zone is 750°–950° C.

4. The direct reduction process of claim 1, wherein said first reducing gas additionally contains 15–40% by volume of carbon monoxide and 30–60% by volume of hydrogen.

5. The direct reduction process of claim 1, wherein said second reducing gas contains 20–60% by volume of carbon monoxide and 30–70% by volume of hydrogen.

6. The direct reduction process of claim 5, wherein said second reducing gas further contains 2–7% by volume of methane.

7. A direct reduction process for producing reduced iron by reducing iron ores and/or pellets with reducing gases comprising the steps of:
   (1) reducing the iron ores and/or pellets to a degree of reduction of 30–80% with a first reducing gas heated to a temperature of more than 950° C. in a first reduction zone, said first reducing gas containing 15–40% by volume of methane, and
   (2) further reducing the iron ores and/or pellets thus reduced with a second reducing gas at a temperature below 1000° C. in a second reduction zone, said second reducing gas containing a high proportion of carbon monoxide and/or hydrogen and a proportion of methane between zero and a proportion which is less than the proportion which causes heavy carbon deposition within the burden or retardation of the rate of reduction.

* * * * *